United States Patent [19]

Gemein et al.

[11] 4,184,721
[45] Jan. 22, 1980

[54] ROTATING DEVICE FOR SHAPES, ESPECIALLY FOR TURBOSETS

[75] Inventors: Rudolf Gemein, Nümbrecht; Erich Pessel, Mülheim, both of Fed. Rep. of Germany

[73] Assignee: Kraftwerk Union Aktiengesellschaft, Mülheim, Fed. Rep. of Germany

[21] Appl. No.: 882,770

[22] Filed: Mar. 2, 1978

[30] Foreign Application Priority Data

Mar. 2, 1977 [DE] Fed. Rep. of Germany ....... 2709047

[51] Int. Cl.² .............................................. F16C 17/00
[52] U.S. Cl. ...................................... 308/9; 308/122
[58] Field of Search ..................... 308/9, 78, 121, 122, 308/240, DIG. 1

[56] References Cited

U.S. PATENT DOCUMENTS

| | | | |
|---|---|---|---|
| 1,499,602 | 7/1924 | Bibbins | 308/9 |
| 2,934,824 | 5/1960 | Braybrook et al. | 308/DIG. 1 |
| 4,090,742 | 5/1978 | Ueda | 308/9 |

FOREIGN PATENT DOCUMENTS

| | | | |
|---|---|---|---|
| 1264166 | 3/1968 | Fed. Rep. of Germany | 308/122 |
| 272901 | 1/1951 | Switzerland | 308/121 |
| 997453 | 7/1965 | United Kingdom | 308/DIG. 1 |

*Primary Examiner*—Charles E. Frankfort
*Attorney, Agent, or Firm*—Herbert L. Lerner

[57] ABSTRACT

Turning device for a shaft includes a bearing for supporting the shaft, the bearing having a lower bearing shell formed, in vicinity of an air-pressure feed, with at least one radially extending relief slot disposed asymmetrically to the center of the bearing and shifted, in rotary direction of the shaft, and means for delivering pressure oil to the relief slot so as to break-away and turn the shaft.

6 Claims, 6 Drawing Figures

ROTATING DEVICE FOR SHAPES, ESPECIALLY FOR TURBOSETS

The invention relates to a rotating or turning device for shafts, especially of turbosets and, more particularly, to such turning devices which are supported in a plurality of sliding radial bearings in the form of circular bearings or rocker-segment bearings provided with an oil-pressure relief device.

Such oil-pressure relieved bearings have become known heretofore, for example, from German Patent DT-PS No. 1 264 166. In the center of such previously known bearings, the lower bearing shell is formed with a relief slot, which provides an oil cushion under the shaft when pressure oil is admitted thereto. When the pressure of the oil is sufficiently high, it lifts the shaft, so that the latter can be turned easily by means of a conventional turning device, for example, in the form of a separate oil turbine. Heretofore, such a separate turning drive has always been necessary for torque breakaway and turning of the shaft.

It is accordingly an object of the invention to provide a turning device for a shaft, wherein the pressure oil per se is utilizable for the breakaway and turning of the shaft, so that a separate turning device is no longer required.

With the foregoing and other objects in view, there is provided, in accordance with the invention, a turning device for a shaft comprising a bearing for supporting the shaft, the bearing having a lower bearing shell formed, in vicinity of an oil-pressure feed, with at least one radially extending relief slot disposed asymmetrically to the center of the bearing and shifted in rotary direction of the shaft, and means for delivering pressure oil to the relief slot so as to break-away and turn the shaft.

Due to this asymmetrical disposition of the relief slot, an asymmetrical lifting of the shaft occurs and, thereby, a substantially tangential flow of oil through the gap located between the shaft and the bearing, which has become wider in direction of rotation of the shaft. In addition to lifting the shaft, the shaft or string of shafts is caused to turn thereby.

In accordance with another feature of the invention, the slot extends over substantially the entire axial length of the bearing shell, the slot having an eccentricity with respect to the bearing center that is equal to about one-fourth the width of the slot, in the rotary direction of the shaft.

In accordance with a further feature of the invention, the lower bearing shell is formed with four axial slots of equal size incized therein, respective pairs of the slots being disposed adjacent one another on opposite sides of the center of the bearing and behind one another in axial direction, the axially directed axis of symmetry (i.e. the imaginary axial line drawn between and equidistant from the respective pairs of slots) of the slots being offset in rotary direction of the shaft with respect to the center of the bearing.

In accordance with an added feature of the invention, the pressure oil has a flow-off direction from the slots corresponding to the direction of rotation of the shaft and the pair of slots disposed axially behind one another and in the flow-off direction from the bearing center having a greater spacing from the bearing center than the pair of slots disposed on the opposite side of the bearing center therefrom.

In order to obtain, with such a construction having four eccentric slots, a better tangential flow-off of the oil and, thereby, an improved turning action, in accordance with concomitant features of the invention, the oil in the slots on both sides of the bearing center is under varying pressure or varying quantities of the oil are received in the slots on both sides of the bearing center.

Other features which are considered as characteristic for the invention are set forth in the appended claims.

Although the invention is illustrated and described herein as embodied in a rotating device for shapes, especially for turbosets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
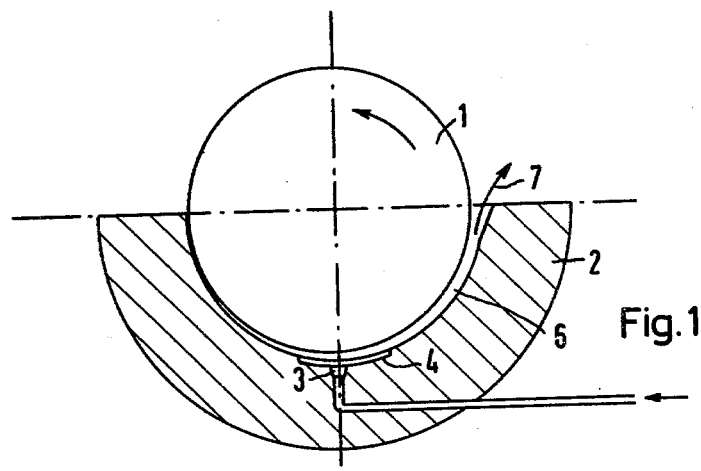
FIG. 1 is a cross-sectional view of the lower bearing shell of a circular shaft bearing with an eccentric relief slot in vicinity of an oil feed, forming part of the rotating device for shafts according to the invention.
Figure 2:
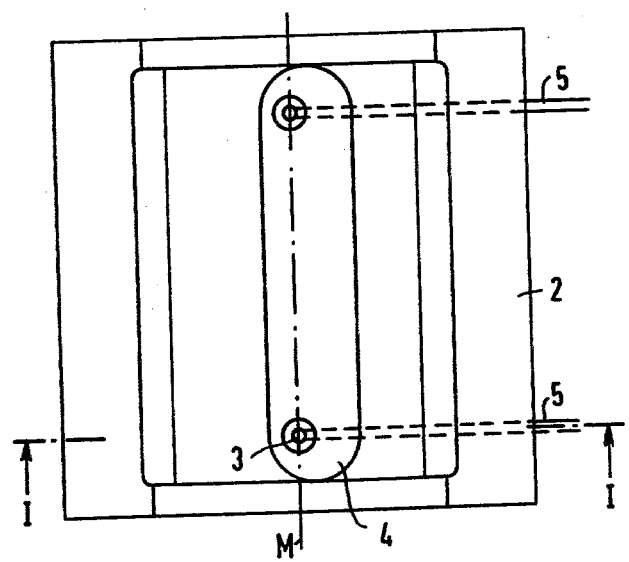
FIG. 2 is a top plan view of the lower bearing shell of FIG. 1.

Referring now to the drawing and first, particularly, to FIG. 1 thereof, there is shown a shaft 1 supported in the lower bearing shell 2 of a circular bearing, the remaining parts of which are not shown in the interest of simplicity, since they are not necessary for an explanation of the invention. In vicinity of an oil-pressure feed 3, an axial relief slot 4 is incised into the lower bearing shell and, as can be seen particularly from the top view of the lower bearing shell 2 as illustrated in FIG. 2, is disposed eccentrically to the center M of the bearing and is shifted in direction of rotation of the shaft 1.

This eccentric disposition of the relief slot 4 has the following effect: After pressure oil is fed in through the oil lines 5 and an appropriate oil pressure is built up in the relief slot 4, the shaft 1 is lifted not only vertically upwardly, but also slightly laterally in accordance with the eccentricity of the relief slot 4, so that a slight gap 6 is produced on the opposite side therefrom between the shaft 1 and the bearing shell 2. In this gap 6, a tangential oil flow represented by the arrow 7 develops, and not only lifts the shaft 1 but also turns it due to the friction of the oil flowing under high pressure.

It is thus possible, therefore, to turn, with the aid of this pressure oil, the entire shaft assembly of a turboset, for example, solely due to the disposition of the relief slot and the build-up of appropriate oil pressure, and without requiring separate turning devices.

Figure 3:
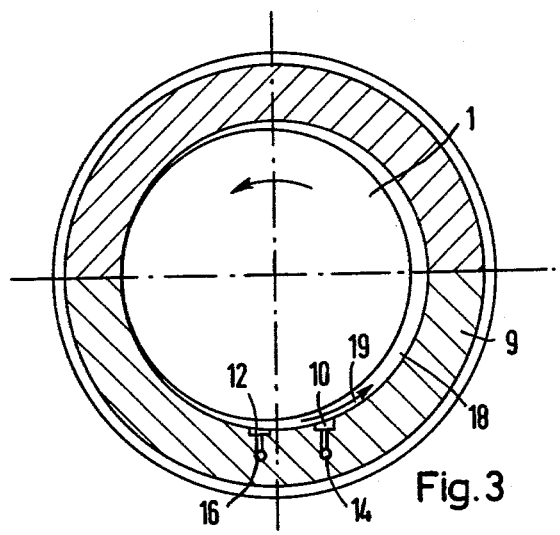
FIG. 3 is a cross-sectional view of a circular bearing with several relief slots formed asymmetrically to the center of the bearing.
Figure 4:
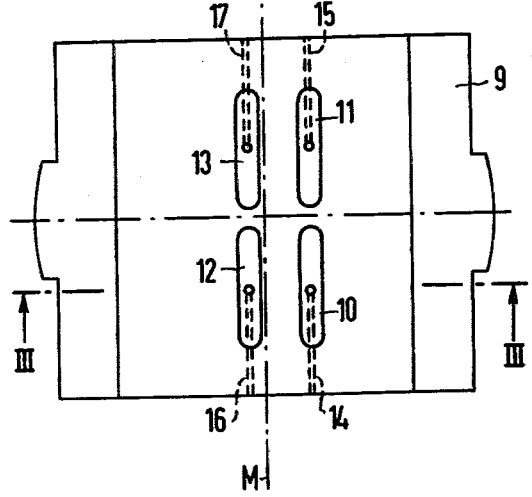
FIG. 4 is a top plan view of the lower bearing shell of the circular bearing of FIG. 3.

Another possibility, which affords even better adjustibility, is shown in FIGS. 3 and 4. A total of four relief slots 10, 11, 12 and 13 are incised into the lower bearing shell 9 thereof, respective pairs of the slots 10 and 11, on the one hand, and 12 and 13, on the other hand, being disposed axially one behind the other. These slots 10 to 13 having the axially directed axis of symmetry thereof displaced eccentrically to the center M of the bearing in the direction of rotation of the shaft and, in fact, in such a manner that the two relief slots 10 and 11 are spaced a greater distance from the center M of the bearing than the two relief slots 12 and 13. Each of these slots 10 to 13 has its own oil feed 14, 15, 16 and 17, respectively, which permits the development, for example, in the slots 10 and 11, of a higher oil pressure than in the slots 12 and 13. The shaft 1 is thereby likewise lifted obliquely upwardly, so that a tangential oil flow represented by the arrow 19 can develop likewise in the resulting gap 18 so that the shaft 1 is simultaneously turned.

Figure 5:
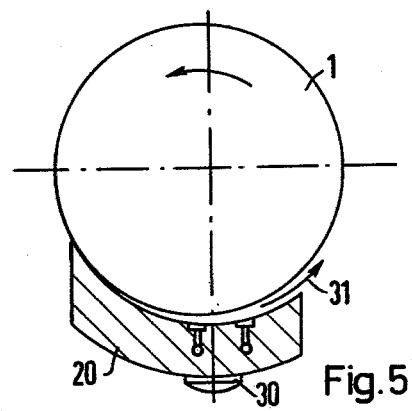
FIG. 5 is a cross-sectional view of the lower segment of a rocker-segment bearing.
Figure 6:
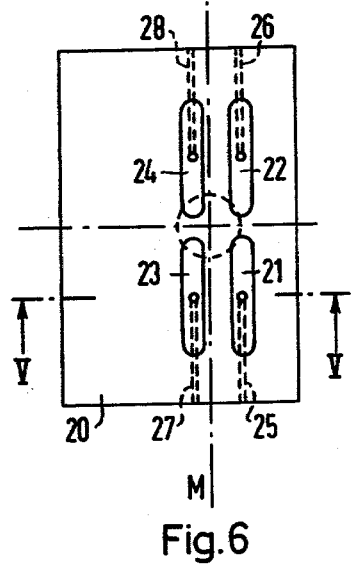
FIG. 6 is a top plan view of the rocker segment of FIG. 5.

In FIGS. 5 and 6, the same measure as in FIGS. 3 and 4 is shown for the case of a rocker segment bearing; for the sake of simplicity, only the lower rocker segment 20 being illustrated. Also in this case, four eccentrically disposed relief slots 21, 22, 23 and 24 are incised into the lower rocker segment 20 and are supplied with pressure oil through suitable connections 25, 26, 27 and 28, respectively. Because of the spherical support or bracing 30 of the lower rocker segment 20, this rocker segment 20 can rock or tilt slightly, after the appropriate oil pressure has been built up, so that also thereby a tangential oil flow represented by the arrow 31 is developed causing the shaft 1 to turn.

We claim:

1. Turning device for a shaft comprising a bearing for supporting the shaft, said bearing having a lower bearing shell formed, in vicinity of an oil-pressure feed, with at least one axially extending relief slot disposed asymmetrically to the center of said bearing and shifted in rotary direction of the shaft, and means for delivering pressure oil to said relief slot so as to break-away and turn the shaft.

2. Turning device according to claim 1 wherein said slot extends over substantially the entire axial length of said bearing shell, said slot having an eccentricity with respect to said bearing center that is equal to about one-fourth the width of said slot in said rotary direction of the shaft.

3. Turning device according to claim 1 wherein said lower bearing shell is formed with four axial slots of equal size incised therein, respective pairs of said slots being disposed adjacent one another on opposite sides of the center of said bearing and behind one another in axial direction, the axially directed axis of symmetry of said slots being offset in rotary direction of the shaft with respect to the center of said bearing.

4. Turning device according to claim 3 wherein the pressure oil has a flow-off direction from said slots corresponding to the direction of rotation of the shaft and the pair of slots disposed axially behind one another and in said flow-off direction from the bearing center having a greater spacing from said bearing center than the pair of slots disposed on the opposite side of said bearing center therefrom.

5. Turning device according to claim 3 wherein the oil in said slots on both sides of said bearing center is under varying pressure.

6. Turning device according to claim 3 wherein varying quantities of the oil are received in said slots on both sides of said bearing center.